United States Patent [19]
Pryor

[11] Patent Number: 6,037,293
[45] Date of Patent: *Mar. 14, 2000

[54] COMPOSITIONS USING HIGH-POTASSIUM ZEOLITE A

[75] Inventor: James Neil Pryor, West Friendship, Md.

[73] Assignee: Grace & Co. -Conn., New York, N.Y.

[*] Notice: This patent is subject to a terminal disclaimer.

[21] Appl. No.: 09/103,049

[22] Filed: Jun. 22, 1998

Related U.S. Application Data

[63] Continuation of application No. 08/451,629, May 26, 1995, Pat. No. 5,773,380.

[51] Int. Cl.[7] ..................................................... B01J 29/04
[52] U.S. Cl. .............................. 502/62; 502/60; 428/34; 52/786.13; 52/172
[58] Field of Search .................... 502/60, 62; 428/34; 52/172, 786.13

[56] References Cited

U.S. PATENT DOCUMENTS

| | | | |
|---|---|---|---|
| 2,882,243 | 4/1959 | Milton | 252/455 |
| 3,758,996 | 9/1973 | Bowser | 52/172 |
| 4,141,186 | 2/1979 | Schoofs | 52/172 |
| 4,604,372 | 8/1986 | Morishita et al. | 502/62 |
| 4,807,419 | 2/1989 | Hodek et al. | 52/788 |
| 5,177,916 | 1/1993 | Misera et al. | 52/172 |
| 5,773,380 | 6/1998 | Pryor | 502/62 |

*Primary Examiner*—Tom Dunn
*Attorney, Agent, or Firm*—Charles A. Cross

[57] ABSTRACT

High potassium zeolite A particles are used to overcome problems of zeolite degassing (and/or undesired gas adsorption/desorption), especially when loaded into organic matrices. The zeolite A particles preferably have a potassium content (measured as $K_2O$) of at least about 14 wt. %, more preferably 15–25 wt. %. Compositions containing the high potassium zeolite A in an organic matrix may be especially suitable for use in insulating glass window spacer applications. The high potassium zeolite A may also be used in other conventional desiccant forms.

15 Claims, 1 Drawing Sheet

COMPOSITIONS USING HIGH-POTASSIUM ZEOLITE A

This is a continuation of application Ser. No. 08/451,629, filed May 26, 1995, now U.S. Pat. No. 5,773,380.

BACKGROUND OF THE INVENTION

Inorganic adsorbent materials, such as molecular sieves, zeolites, etc., have long been used to remove constituents (especially water) from (gaseous and/or liquid) fluids. Zeolites such as zeolites A and X are widely used in desiccating and gas treatment applications.

In many instances, the adsorbent material is used in the form of a free flowing particulate (e.g. beads) which is allowed to contact the fluid to be treated. In other instances, the adsorbent may be embedded in a rigid monolithic structure such as a honeycomb. For many applications, these forms of the adsorbent cannot be used practically. For example, in the window spacer structures disclosed in U.S. Pat. Nos. 5,177,916 and 5,255,481, the adsorbent material is loaded into an organic matrix which is then adhered to the spacer. The disclosures of these window spacer patents are incorporated herein by reference.

In adsorbent/organic matrix composites, the adsorbent is typically incorporated into the organic matrix by mechanical mixing while the organic material is in a very soft or molten state. See for example, applicants co-pending U.S. patent application Ser. No. 08/304,312, filed Sep. 13, 1994, now abandoned, the disclosure of which is incorporated herein by reference. It is generally desirable to incorporate as much of the adsorbent material as possible per unit of organic matrix so as to enhance the adsorption performance of the adsorbent/organic matrix composite as well as to reduce the cost of the composite in situations where the organic matrix is more expensive than the adsorbent material.

Unfortunately, it has been found that many adsorbents (such as conventional potassium-containing 3A zeolites) are prone to degassing (i.e., gas evolution) during or after compounding with an organic matrix at elevated temperature. This degassing effect is especially pronounced at high adsorbent loadings and where the compounding temperature is high. Degassing leads to unsightly product appearance, unwanted expansion of the product after formulation, etc.

Unwanted gas adsorption/desorption (especially $N_2$) may also occur where desiccating adsorbents are used in closed air-containing environments which are subject to fluctuations in temperature involving long holding times at or near the temperature limits of the fluctuation. For example, such situations may arise where conventional desiccant beads are used in a window which is exposed to a long term low temperature or high temperature condition.

While the degassing problem, in the context of compounded compositions, can be alleviated to some extent by heat treating the adsorbent immediately before compounding, such heat treating adds an extra step to the formulating process and requires the installation of additional equipment at the manufacturing site where the compounding is being performed. Thus, there is a need for adsorbent/organic matrix compositions which exhibit minimal or no degassing effect associated with the adsorbent while still functioning for the desired desiccation or adsorption application. There is also a need for desiccants which do not exhibit undesired gas adsorption/desorption behavior.

SUMMARY OF THE INVENTION

The invention overcomes the disadvantages of known inorganic adsorbent/organic matrix composites by the use of zeolite A (or 3A) molecular sieves which contain a high amount of potassium. The use of the molecular sieves of the invention overcomes the degassing problem existent in known formulations. The invention further overcomes the gas adsorption/desorption problem of desiccating agents in conventional desiccant applications.

In one aspect, the invention encompasses compositions comprising molecular sieve particles in an organic matrix wherein at least a portion of the molecular sieve particles are zeolite A particles having a potassium content (measured as $K_2O$) of at least about 14 wt. %, more preferably 15–25 wt. %.

Preferably, the organic matrix is a so-called "hot melt" adhesive. The compositions of the invention are preferably suitable for use in insulating glass window spacer applications.

In another aspect, the invention encompasses the use of high potassium zeolite A for general desiccation or adsorption applications such as in desiccant beads which contain the high potassium zeolite A in combination with a binder.

These and other aspects of the invention will be described in further detail below.

DETAILED DESCRIPTION OF THE INVENTION

Figure 1:
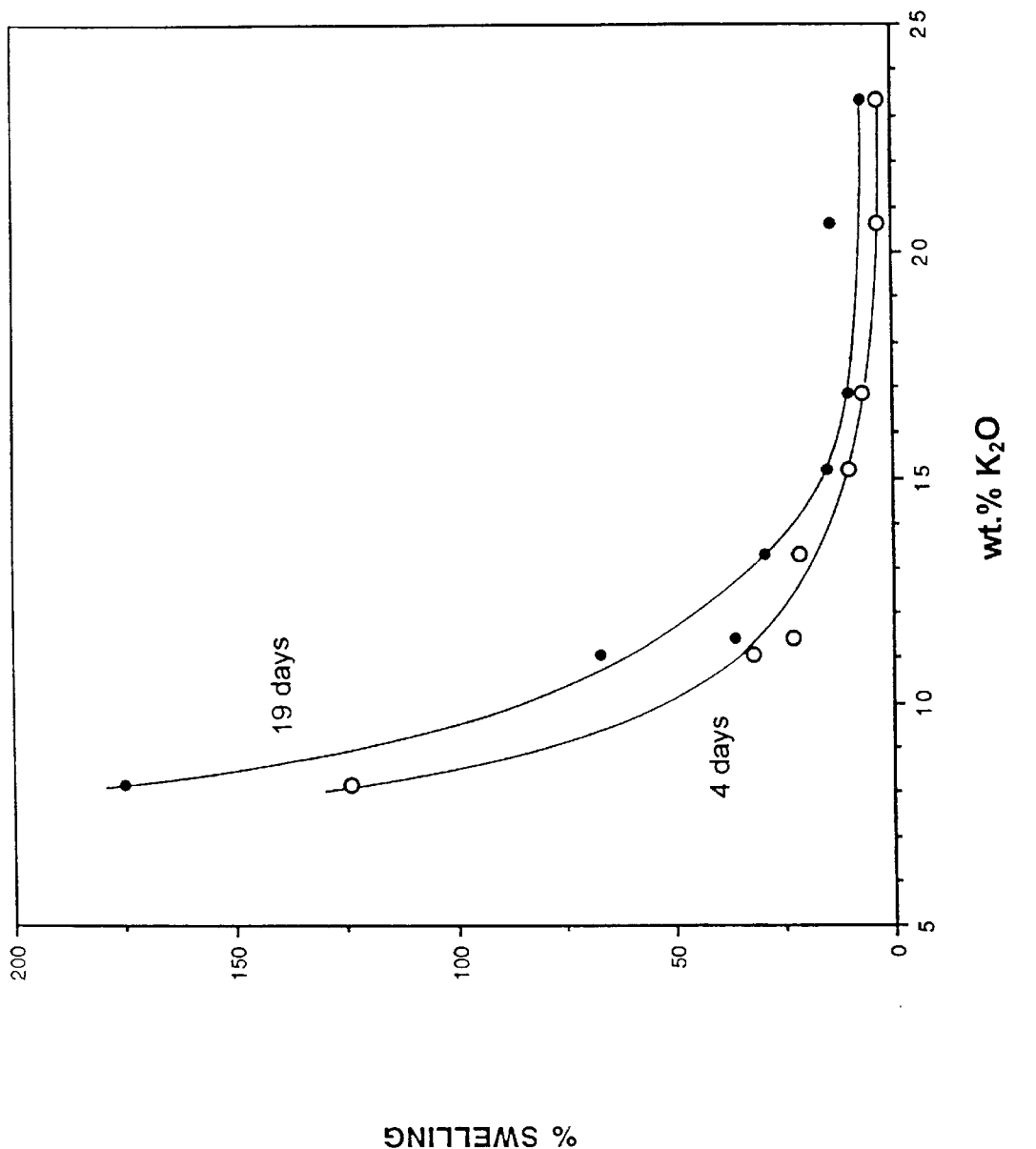
FIG. 1 shows a plot of swelling vs. potassium content of the zeolite at constant loading for zeolite A—olefin polymer composites.

The invention encompasses the concept that degassing (and undesired gas adsorption/desorption) problems in desiccant or adsorbent applications can be avoided by use of high potassium zeolite A molecular sieves. This concept is especially applicable for desiccant/organic matrix composite compositions such as those used in insulating glass applications and other desiccant compositions.

The zeolite a compositions of the invention can be made by any known process for making zeolite 3A, except that a much higher potassium loading is used compared to conventional 3A zeolites used for desiccant applications. Preferably, the zeolite of the invention is formed by first making a Na-A zeolite followed by ion exchange with potassium as described in U.S. Pat. No. 2,882,343. The potassium exchange is preferably conducted to achieve a potassium content (measured as $K_2O$) of at least about 14 wt. % (dry basis), more preferably about 15–25 wt. %, most preferably about 16–20 wt. %.

While the high potassium 3A zeolite of the invention is especially suitable for use in adsorbent/organic matrix applications where degassing of the zeolite is problematic, the high potassium 3A zeolite may also be used in conventional desiccant/adsorbent applications. Thus, the high potassium zeolite may be used in any conventional form such as beads (i.e., agglomerated with a binder) described in U.S. Pat. Nos. 3,624,003 and 3,625,866 (the disclosures of which are incorporated herein by reference) or as otherwise known in the art.

Where the high potassium 3A sieve of the invention is used in an organic matrix, the amount of the sieve of the invention incorporated into the organic matrix can vary depending on the desired desiccating capacity, the Theological properties of the specific organic matrix, and the intended end application. For most conventional organic resins, a loading of about 35–65 wt. % activated crystalline molecular sieve is preferred. More preferably, the loading is about 40–60 wt. %. If desired, other molecular sieves may be used in combination with the high potassium 3A sieve of the invention. Where a high zeolite loading is desired, preferably the zeolite used is predominantly of a single crystal character as described in U.S. patent application Ser. No. 08/451,606 now abandoned.

The organic matrix component preferably contains an organic resin useful in desiccant/organic matrix composite applications. Examples of suitable matrix resins are described in U.S. Pat. Nos. 5,177,916 and 5,255,481. The invention is especially useful where the organic matrix contains a thermoplastic resin such as a hot melt adhesive. Preferred thermoplastic resins have a Brookfield viscosity (@ 190° C.—ASTM D 3236) of about 2000–6000 cP (2.0–6.0 Pa-sec), more preferably about 3000–4000 cP. An alternate characteristic of preferable resins is that they have a viscosity at 124° C. of about 4000–8000 cP. Further alternative characteristics of preferable resins are that they have a melt flow index of about 100–200 and a softening point of at least 90° C. A preferred classes of resins are olefin copolymers and terpolymers such as described in U.S. patent application Ser. No. 304,312 filed on Sep. 13, 1994 the disclosure of which is incorporated herein by reference.

The organic matrix component may contain other additives such as tackifiers, antioxidants, coloring agents, etc. depending on the intended end use. The amount of tackifier use is preferably about 0–20 wt. % based on the total weight of the organic matrix component, more preferably about 5–15 wt. %. Polyisobutylene is a preferred tackifier. Depending on the particular end use, components other than the molecular sieve component and the organic matrix component may be present in the composition, however, preferably the compositions of the invention consist essentially of the molecular sieve component and the organic matrix component.

As shown in FIG. 1, the effect of increasing the potassium level beyond that of conventional 3A zeolites (9–12 wt. %) is a dramatic decrease in desiccant/organic matrix swelling on heating to 149° C.

The adsorbent/organic matrix compositions of the invention may be formed by any conventional blending method. Preferably, the ingredients of the organic matrix are combined together before addition of the adsorbent component. Where the organic resin used possesses hot melt characteristics, the mixing is preferably conducted with heating (about 180–310° F.) to potassium 3A zeolite component is preferably thermally activated using conditions known in the art before it is combined with the organic matrix. Where multiple adsorbents are used, preferably the adsorbents are physically blended with each other before addition to the heated matrix. Once the adsorbent/organic matrix composition is formed, it can be applied to the desired substrate by any conventional technique.

The aspects of invention are further illustrated by the following examples.

EXAMPLE 8 samples of zeolite 3A particles were prepared by exchanging Na-A zeolite with aqueous KCl solutions of varying strengths followed by thorough water washing, drying at 121° C., and activation at 454° C. to achieve the $K_2O$ and $Na_2O$ levels shown in Table 1 below. Examples 2 and 3 are typical of conventional 3A zeolites.

TABLE 1

| Example | $K_2O$ (wt. %) | $Na_2O$ (wt. %) |
|---|---|---|
| 1 | 8.2 | 15.1 |
| 2 | 10.9 | 13.8 |
| 3 | 11.8 | 12.1 |
| 4 | 13.3 | 11.5 |
| 5 | 15.2 | 9.5 |
| 6 | 16.8 | 8.7 |
| 7 | 20.6 | 6.6 |
| 8 | 23.3 | 4.4 |

The activated samples were then compounded at 50 wt. % loading with an olefin polymer matrix in a Brabender mixer at the minimum temperature needed to ensure adequate blending (to minimize subsequent zeolite degassing). For each sample, blends were made at 4 and 19 days after activation. The resulting blends were then softened at 66° C. and pressed into a 20×30 mm cylindrical vial. The samples were placed in a 149° C. preheated oven, and the height of the swelling was measured as the change in height of the cylindrical shape. The samples were kept in the oven until the maximum swelling was reached.

Table 2 below shows the swelling amounts for the samples compounded 4 days after activation. For comparison, a sample (blank) of the organic matrix without zeolite is also shown.

TABLE 2

| Example | $K_2O$ level | Maximum Swelling (%) |
|---|---|---|
| 1 | 8.2 | 124 |
| 2 | 10.9 | 32 |
| 3 | 11.8 | 23 |
| 4 | 13.3 | 21 |
| 5 | 15.2 | 10 |
| 6 | 16.8 | 7 |
| 7 | 20.6 | 3 |
| 8 | 23.3 | 3 |
| Blank | — | 4 |

A comparison of the swelling for the samples compounded after 4 and 19 days is shown in FIG. 1. The results in FIG. 1 indicate that the samples of the invention compounded after 19 days still show a significant improvement compared to conventional 3A zeolites.

What is claimed is:

1. A composition comprising molecular sieve particles in organic adhesive matrix wherein at least a portion of said molecular sieve particles are zeolite A particles which contain at least 15 wt. % $K_2O$ (dry basis).

2. The composition of claim 1 wherein said zeolite A contains about 15–25 wt. % $K_2O$.

3. The composition of claim 2 wherein said zeolite A contains about 16–20 wt. % $K_2O$.

4. The composition of claim 1 wherein said composition contains about 35–65 wt. % of said zeolite A.

5. The composition of claim 4 wherein said composition contains about 40–60 wt. % of said zeolite A.

6. The composition of claim 1 wherein said organic matrix is a hot melt adhesive.

7. The composition of claim 1 wherein said molecular sieve consists essentially of said zeolite A.

8. A thermoplastic desiccating adhesive composition comprising zeolite A particles containing at least 15 wt. % $K_2O$ (dry basis) in a thermoplastic organic adhesive matrix.

9. The composition of claim 8 wherein said zeolite A contains about 15–25 wt. % $K_2O$.

10. The composition of claim 9 wherein said zeolite A contains about 16–20 wt. % $K_2O$.

11. The composition of claim 8 wherein said composition contains about 35–65 wt. % of said zeolite A.

12. The composition of claim 11 wherein said composition contains about 40–60 wt. % of said zeolite A.

13. In a window frame construction comprising a spacer containing a desiccating adhesive composition of molecular sieve in organic adhesive matrix, the improvement comprising at least a portion of said molecular sieve particles being zeolite A particles containing at least 15 wt. % $K_2O$ (dry basis).

14. The window frame construction of claim 13 wherein said adhesive composition is hot melt adhesive.

15. The window frame construction of claim 13 wherein said zeolite A contains at least 15–25 wt. % $K_2O$.

* * * * *